United States Patent
Kahn et al.

(10) Patent No.: US 8,902,154 B1
(45) Date of Patent: Dec. 2, 2014

(54) METHOD AND APPARATUS FOR UTILIZING MOTION USER INTERFACE

(75) Inventors: Philippe Richard Kahn, Santa Cruz, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 1220 days.

(21) Appl. No.: 11/776,532

(22) Filed: Jul. 11, 2007

Related U.S. Application Data

(60) Provisional application No. 60/830,205, filed on Jul. 11, 2006.

(51) Int. Cl.
*G09G 5/00* (2006.01)
*H04B 1/38* (2006.01)
*H04M 11/04* (2006.01)

(52) U.S. Cl.
USPC ............. 345/156; 345/169; 455/90.1; 379/51

(58) Field of Classification Search
CPC ..... G06F 3/017; G06F 3/0325; G06F 1/1694; G06F 3/0487; G06F 17/30032; G06F 17/30035
USPC ............. 345/156–184; 702/141; 73/488–491, 73/503.3–504.18, 514.01–514.39; 455/90.1, 564; 379/37–51
See application file for complete search history.

(56) References Cited

U.S. PATENT DOCUMENTS

| | | | |
|---|---|---|---|
| 4,285,041 | A | 8/1981 | Smith |
| 4,571,680 | A | 2/1986 | Wu |
| 4,578,769 | A | 3/1986 | Frederick |
| 4,700,369 | A | 10/1987 | Seigal et al. |
| 4,776,323 | A | 10/1988 | Spector |
| 5,323,060 | A | 6/1994 | Gast et al. |
| 5,386,210 | A | 1/1995 | Lee |
| 5,430,480 | A | 7/1995 | Allen et al. |
| 5,446,725 | A | 8/1995 | Ishiwatari |
| 5,446,775 | A | 8/1995 | Wright et al. |
| 5,454,114 | A | 9/1995 | Yach et al. |
| 5,485,402 | A | 1/1996 | Smith et al. |
| 5,506,987 | A | 4/1996 | Abramson et al. |
| 5,515,419 | A * | 5/1996 | Sheffer ...................... 455/456.5 |
| 5,583,776 | A | 12/1996 | Levi et al. |
| 5,593,431 | A | 1/1997 | Sheldon |
| 5,654,619 | A | 8/1997 | Iwashita |

(Continued)

FOREIGN PATENT DOCUMENTS

| | | |
|---|---|---|
| EP | 1 104 143 | 5/2001 |
| EP | 0 833 537 | 7/2002 |

(Continued)

OTHER PUBLICATIONS

International Search Report and Written Opinion, PCT/US2008/000928, International Filing Date: Jan. 23, 2008, Jun. 10, 2008, 8 pages.

(Continued)

*Primary Examiner* — Joe H Cheng
*Assistant Examiner* — Keith Crawley
(74) *Attorney, Agent, or Firm* — HIPLegal LLP; Judith A. Szepesi

(57) ABSTRACT

A method and apparatus for utilizing gestures for navigating.

21 Claims, 9 Drawing Sheets

(56) References Cited

U.S. PATENT DOCUMENTS

| | | |
|---|---|---|
| 5,703,786 A | 12/1997 | Conkright |
| 5,737,439 A | 4/1998 | Lapsley et al. |
| 5,771,001 A | 6/1998 | Cobb |
| 5,778,882 A | 7/1998 | Raymond et al. |
| 5,911,065 A | 6/1999 | Williams et al. |
| 5,955,667 A | 9/1999 | Fyfe |
| 5,955,871 A | 9/1999 | Nguyen |
| 5,960,085 A | 9/1999 | de la Huerga |
| 5,976,083 A | 11/1999 | Richardson et al. |
| 6,013,007 A | 1/2000 | Root et al. |
| 6,061,456 A | 5/2000 | Andrea et al. |
| 6,122,595 A | 9/2000 | Varley et al. |
| 6,129,686 A | 10/2000 | Friedman |
| 6,135,951 A | 10/2000 | Richardson et al. |
| 6,145,389 A | 11/2000 | Ebeling et al. |
| 6,246,321 B1 | 6/2001 | Rechsteiner et al. |
| 6,282,496 B1 | 8/2001 | Chowdhary |
| 6,353,449 B1 | 3/2002 | Gregg et al. |
| 6,369,794 B1 | 4/2002 | Sakurai et al. |
| 6,396,883 B2 | 5/2002 | Yang et al. |
| 6,408,330 B1 | 6/2002 | de la Huerga |
| 6,428,490 B1 | 8/2002 | Kramer et al. |
| 6,470,147 B1 | 10/2002 | Imada |
| 6,478,736 B1 | 11/2002 | Mault |
| 6,493,652 B1 | 12/2002 | Ohlenbusch et al. |
| 6,496,695 B1 | 12/2002 | Kouji et al. |
| 6,513,381 B2 | 2/2003 | Fyfe et al. |
| 6,522,266 B1 | 2/2003 | Soehren et al. |
| 6,529,144 B1 * | 3/2003 | Nilsen et al. .................... 341/20 |
| 6,532,419 B1 | 3/2003 | Begin et al. |
| 6,539,336 B1 | 3/2003 | Vock et al. |
| 6,595,929 B2 | 7/2003 | Stivoric et al. |
| 6,607,493 B2 | 8/2003 | Song |
| 6,611,789 B1 | 8/2003 | Darley |
| 6,628,898 B2 | 9/2003 | Endo |
| 6,634,992 B1 | 10/2003 | Ogawa |
| 6,665,802 B1 | 12/2003 | Ober |
| 6,672,991 B2 | 1/2004 | O'Malley |
| 6,685,480 B2 | 2/2004 | Nishimoto et al. |
| 6,700,499 B2 | 3/2004 | Kubo et al. |
| 6,731,958 B1 | 5/2004 | Shirai |
| 6,771,250 B1 | 8/2004 | Oh |
| 6,786,877 B2 | 9/2004 | Foxlin |
| 6,788,980 B1 | 9/2004 | Johnson |
| 6,790,178 B1 | 9/2004 | Mault et al. |
| 6,807,564 B1 * | 10/2004 | Zellner et al. ................. 709/206 |
| 6,813,582 B2 | 11/2004 | Levi et al. |
| 6,823,036 B1 | 11/2004 | Chen |
| 6,826,477 B2 | 11/2004 | Ladetto et al. |
| 6,836,744 B1 | 12/2004 | Asphahani et al. |
| 6,881,191 B2 | 4/2005 | Oakley et al. |
| 6,885,971 B2 | 4/2005 | Vock et al. |
| 6,895,425 B1 | 5/2005 | Kadyk et al. |
| 6,898,550 B1 | 5/2005 | Blackadar et al. |
| 6,928,382 B2 | 8/2005 | Hong et al. |
| 6,941,239 B2 | 9/2005 | Unuma et al. |
| 6,959,259 B2 | 10/2005 | Vock et al. |
| 6,975,959 B2 | 12/2005 | Dietrich et al. |
| 7,002,553 B2 * | 2/2006 | Shkolnikov .................... 345/169 |
| 7,010,332 B1 | 3/2006 | Irvin et al. |
| 7,020,487 B2 | 3/2006 | Kimata |
| 7,027,087 B2 | 4/2006 | Nozaki et al. |
| 7,028,547 B2 * | 4/2006 | Shiratori et al. ................ 73/495 |
| 7,042,509 B2 | 5/2006 | Onuki |
| 7,054,784 B2 | 5/2006 | Flentov et al. |
| 7,057,551 B1 | 6/2006 | Vogt |
| 7,072,789 B2 | 7/2006 | Vock et al. |
| 7,092,846 B2 | 8/2006 | Vock et al. |
| 7,096,619 B2 | 8/2006 | Jackson et al. |
| 7,148,797 B2 | 12/2006 | Albert |
| 7,148,879 B2 * | 12/2006 | Amento et al. ................ 345/158 |
| 7,149,964 B1 | 12/2006 | Cottrille et al. |
| 7,155,507 B2 | 12/2006 | Hirano et al. |
| 7,158,912 B2 | 1/2007 | Vock et al. |
| 7,169,084 B2 | 1/2007 | Tsuji |
| 7,171,222 B2 | 1/2007 | Fostick |
| 7,171,331 B2 | 1/2007 | Vock et al. |
| 7,173,604 B2 * | 2/2007 | Marvit et al. ................. 345/156 |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,177,684 B1 | 2/2007 | Kroll et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,200,517 B2 | 4/2007 | Darley et al. |
| 7,212,230 B2 | 5/2007 | Stavely |
| 7,212,943 B2 | 5/2007 | Aoshima et al. |
| 7,220,220 B2 | 5/2007 | Stubbs et al. |
| 7,245,725 B1 | 7/2007 | Beard |
| 7,254,516 B2 | 8/2007 | Case et al. |
| 7,280,096 B2 | 10/2007 | Marvit et al. |
| 7,280,849 B1 | 10/2007 | Bailey |
| 7,297,088 B2 | 11/2007 | Tsuji |
| 7,301,526 B2 | 11/2007 | Marvit et al. |
| 7,301,527 B2 | 11/2007 | Marvit et al. |
| 7,301,528 B2 | 11/2007 | Marvit et al. |
| 7,301,529 B2 | 11/2007 | Marvit et al. |
| 7,305,323 B2 | 12/2007 | Skvortsov et al. |
| 7,334,472 B2 | 2/2008 | Seo et al. |
| 7,382,611 B2 | 2/2008 | Klees et al. |
| 7,353,112 B2 | 4/2008 | Choi et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| 7,379,999 B1 | 5/2008 | Zhou et al. |
| 7,387,611 B2 | 6/2008 | Inoue et al. |
| 7,397,357 B2 | 7/2008 | Krumm et al. |
| 7,451,056 B2 | 11/2008 | Flentov et al. |
| 7,457,719 B1 | 11/2008 | Kahn et al. |
| 7,457,872 B2 | 11/2008 | Aton et al. |
| 7,463,997 B2 | 12/2008 | Pasolini et al. |
| 7,467,060 B2 | 12/2008 | Kulach et al. |
| 7,489,937 B2 | 2/2009 | Chung et al. |
| 7,502,643 B2 | 3/2009 | Farringdon et al. |
| 7,512,515 B2 | 3/2009 | Vock et al. |
| 7,526,402 B2 | 4/2009 | Tanenhaus et al. |
| 7,608,050 B2 | 10/2009 | Shugg |
| 7,640,804 B2 | 1/2010 | Daumer et al. |
| 7,647,196 B2 | 1/2010 | Kahn et al. |
| 7,653,508 B1 | 1/2010 | Kahn et al. |
| 7,664,657 B1 | 2/2010 | Letzt et al. |
| 7,689,107 B2 | 3/2010 | Enomoto |
| 7,705,884 B2 | 4/2010 | Pinto et al. |
| 7,752,011 B2 | 7/2010 | Niva et al. |
| 7,753,861 B1 | 7/2010 | Kahn et al. |
| 7,765,553 B2 | 7/2010 | Douceur et al. |
| 7,774,156 B2 | 8/2010 | Niva et al. |
| 7,788,059 B1 | 8/2010 | Kahn et al. |
| 7,857,772 B2 | 12/2010 | Bouvier et al. |
| 7,881,902 B1 | 2/2011 | Kahn et al. |
| 7,892,080 B1 | 2/2011 | Dahl |
| 7,987,070 B2 | 7/2011 | Kahn et al. |
| 8,187,182 B2 | 5/2012 | Kahn et al. |
| 8,275,635 B2 | 9/2012 | Stivoric et al. |
| 8,398,546 B2 | 3/2013 | Pacione et al. |
| 2001/0047488 A1 | 11/2001 | Verplaetse et al. |
| 2002/0006284 A1 | 1/2002 | Kim |
| 2002/0023654 A1 | 2/2002 | Webb |
| 2002/0027164 A1 | 3/2002 | Mault et al. |
| 2002/0042830 A1 | 4/2002 | Bose et al. |
| 2002/0044634 A1 | 4/2002 | Rooke et al. |
| 2002/0054214 A1 | 5/2002 | Yoshikawa |
| 2002/0089425 A1 | 7/2002 | Kubo et al. |
| 2002/0109600 A1 | 8/2002 | Mault et al. |
| 2002/0118121 A1 | 8/2002 | Lehrman et al. |
| 2002/0122543 A1 | 9/2002 | Rowen |
| 2002/0138017 A1 | 9/2002 | Bui et al. |
| 2002/0142887 A1 | 10/2002 | O'Malley |
| 2002/0150302 A1 | 10/2002 | McCarthy et al. |
| 2002/0151810 A1 | 10/2002 | Wong et al. |
| 2002/0173295 A1 | 11/2002 | Nykanen et al. |
| 2002/0190947 A1 | 12/2002 | Feinstein |
| 2002/0193124 A1 | 12/2002 | Hamilton et al. |

(56) References Cited

U.S. PATENT DOCUMENTS

| | | |
|---|---|---|
| 2003/0018430 A1 | 1/2003 | Ladetto et al. |
| 2003/0033411 A1 | 2/2003 | Kavoori et al. |
| 2003/0048218 A1 | 3/2003 | Milnes et al. |
| 2003/0083596 A1 | 5/2003 | Kramer et al. |
| 2003/0093187 A1* | 5/2003 | Walker .............. 701/1 |
| 2003/0101260 A1 | 5/2003 | Dacier et al. |
| 2003/0109258 A1 | 6/2003 | Mantyjarvi et al. |
| 2003/0139692 A1 | 7/2003 | Barrey et al. |
| 2003/0139908 A1 | 7/2003 | Wegerich et al. |
| 2003/0149526 A1 | 8/2003 | Zhou et al. |
| 2003/0151672 A1 | 8/2003 | Robins et al. |
| 2003/0187683 A1 | 10/2003 | Kirchhoff et al. |
| 2003/0208110 A1 | 11/2003 | Mault et al. |
| 2003/0208113 A1 | 11/2003 | Mault et al. |
| 2003/0227487 A1 | 12/2003 | Hugh |
| 2003/0236625 A1 | 12/2003 | Brown et al. |
| 2004/0017300 A1 | 1/2004 | Kotzin et al. |
| 2004/0024846 A1 | 2/2004 | Randall et al. |
| 2004/0043760 A1 | 3/2004 | Rosenfeld et al. |
| 2004/0044493 A1 | 3/2004 | Coulthard |
| 2004/0047498 A1 | 3/2004 | Mulet-Parada et al. |
| 2004/0078219 A1 | 4/2004 | Kaylor et al. |
| 2004/0078220 A1 | 4/2004 | Jackson |
| 2004/0081441 A1 | 4/2004 | Sato et al. |
| 2004/0106421 A1 | 6/2004 | Tomiyoshi et al. |
| 2004/0106958 A1 | 6/2004 | Mathis et al. |
| 2004/0122294 A1 | 6/2004 | Hatlestad et al. |
| 2004/0122295 A1 | 6/2004 | Hatlestad et al. |
| 2004/0122296 A1 | 6/2004 | Hatlestad et al. |
| 2004/0122297 A1 | 6/2004 | Stahmann et al. |
| 2004/0122333 A1 | 6/2004 | Nissila |
| 2004/0122484 A1 | 6/2004 | Hatlestad et al. |
| 2004/0122485 A1 | 6/2004 | Stahmann et al. |
| 2004/0122486 A1 | 6/2004 | Stahmann et al. |
| 2004/0122487 A1 | 6/2004 | Hatlestad et al. |
| 2004/0125073 A1 | 7/2004 | Potter et al. |
| 2004/0130628 A1 | 7/2004 | Stavely |
| 2004/0135898 A1 | 7/2004 | Zador |
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0176067 A1 | 9/2004 | Lakhani et al. |
| 2004/0185821 A1 | 9/2004 | Yuasa |
| 2004/0219910 A1 | 11/2004 | Beckers |
| 2004/0225467 A1 | 11/2004 | Vock et al. |
| 2004/0236500 A1 | 11/2004 | Choi et al. |
| 2004/0242202 A1 | 12/2004 | Torvinen |
| 2004/0247030 A1 | 12/2004 | Wiethoff |
| 2004/0259494 A1 | 12/2004 | Mazar |
| 2005/0015768 A1 | 1/2005 | Moore |
| 2005/0027567 A1 | 2/2005 | Taha |
| 2005/0033200 A1 | 2/2005 | Soehren et al. |
| 2005/0038691 A1 | 2/2005 | Babu |
| 2005/0048945 A1* | 3/2005 | Porter ................ 455/404.1 |
| 2005/0048955 A1* | 3/2005 | Ring ................. 455/414.1 |
| 2005/0078197 A1 | 4/2005 | Gonzalez |
| 2005/0079873 A1 | 4/2005 | Caspi et al. |
| 2005/0101841 A9 | 5/2005 | Kaylor et al. |
| 2005/0102167 A1 | 5/2005 | Kapoor |
| 2005/0107944 A1 | 5/2005 | Hovestadt et al. |
| 2005/0113649 A1 | 5/2005 | Bergantino |
| 2005/0113650 A1 | 5/2005 | Pacione et al. |
| 2005/0131736 A1 | 6/2005 | Nelson et al. |
| 2005/0141522 A1 | 6/2005 | Kadar et al. |
| 2005/0143106 A1 | 6/2005 | Chan et al. |
| 2005/0146431 A1 | 7/2005 | Hastings et al. |
| 2005/0157181 A1 | 7/2005 | Kawahara et al. |
| 2005/0165719 A1 | 7/2005 | Greenspan et al. |
| 2005/0168587 A1 | 8/2005 | Sato et al. |
| 2005/0182824 A1 | 8/2005 | Cotte |
| 2005/0183086 A1 | 8/2005 | Abe et al. |
| 2005/0202934 A1 | 9/2005 | Olrik et al. |
| 2005/0203430 A1 | 9/2005 | Williams et al. |
| 2005/0210300 A1 | 9/2005 | Song et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212760 A1 | 9/2005 | Marvit et al. |
| 2005/0216403 A1 | 9/2005 | Tam et al. |
| 2005/0222801 A1 | 10/2005 | Wulff et al. |
| 2005/0232388 A1 | 10/2005 | Tsuji |
| 2005/0232404 A1 | 10/2005 | Gaskill |
| 2005/0234676 A1 | 10/2005 | Shibayama |
| 2005/0235058 A1 | 10/2005 | Rackus et al. |
| 2005/0238132 A1 | 10/2005 | Tsuji |
| 2005/0240375 A1 | 10/2005 | Sugai |
| 2005/0243178 A1 | 11/2005 | McConica |
| 2005/0245988 A1 | 11/2005 | Miesel |
| 2005/0248718 A1 | 11/2005 | Howell et al. |
| 2005/0256414 A1 | 11/2005 | Kettunen et al. |
| 2005/0258938 A1 | 11/2005 | Moulson |
| 2005/0262237 A1 | 11/2005 | Fulton et al. |
| 2005/0281289 A1 | 12/2005 | Huang et al. |
| 2006/0009243 A1 | 1/2006 | Dahan et al. |
| 2006/0017692 A1 | 1/2006 | Wehrenberg et al. |
| 2006/0020177 A1 | 1/2006 | Seo et al. |
| 2006/0029284 A1 | 2/2006 | Stewart |
| 2006/0063980 A1 | 3/2006 | Hwang et al. |
| 2006/0064276 A1 | 3/2006 | Ren et al. |
| 2006/0080551 A1 | 4/2006 | Mantyjarvi et al. |
| 2006/0090088 A1 | 4/2006 | Choi et al. |
| 2006/0090161 A1 | 4/2006 | Bodas et al. |
| 2006/0098097 A1 | 5/2006 | Wach et al. |
| 2006/0100546 A1 | 5/2006 | Silk |
| 2006/0109113 A1 | 5/2006 | Reyes et al. |
| 2006/0136173 A1 | 6/2006 | Case, Jr. et al. |
| 2006/0140422 A1 | 6/2006 | Zurek et al. |
| 2006/0149516 A1 | 7/2006 | Bond et al. |
| 2006/0154642 A1 | 7/2006 | Scannell, Jr. |
| 2006/0161377 A1 | 7/2006 | Rakkola et al. |
| 2006/0161459 A9 | 7/2006 | Rosenfeld et al. |
| 2006/0167387 A1 | 7/2006 | Buchholz et al. |
| 2006/0167647 A1 | 7/2006 | Krumm et al. |
| 2006/0167943 A1 | 7/2006 | Rosenberg |
| 2006/0172706 A1 | 8/2006 | Griffin et al. |
| 2006/0174685 A1 | 8/2006 | Skvortsov et al. |
| 2006/0201964 A1* | 9/2006 | DiPerna et al. .............. 222/78 |
| 2006/0204214 A1 | 9/2006 | Shah et al. |
| 2006/0205406 A1 | 9/2006 | Pekonen et al. |
| 2006/0206258 A1 | 9/2006 | Brooks |
| 2006/0223547 A1 | 10/2006 | Chin et al. |
| 2006/0249683 A1 | 11/2006 | Goldberg et al. |
| 2006/0256082 A1* | 11/2006 | Cho et al. .............. 345/156 |
| 2006/0257042 A1 | 11/2006 | Ofek et al. |
| 2006/0259268 A1 | 11/2006 | Vock et al. |
| 2006/0284979 A1 | 12/2006 | Clarkson |
| 2006/0288781 A1 | 12/2006 | Daumer et al. |
| 2006/0289819 A1 | 12/2006 | Parsons et al. |
| 2007/0004451 A1 | 1/2007 | C. Anderson |
| 2007/0005988 A1 | 1/2007 | Zhang et al. |
| 2007/0017136 A1 | 1/2007 | Mosher et al. |
| 2007/0024441 A1 | 2/2007 | Kahn et al. |
| 2007/0037605 A1 | 2/2007 | Logan et al. |
| 2007/0037610 A1 | 2/2007 | Logan |
| 2007/0038364 A1 | 2/2007 | Lee et al. |
| 2007/0040892 A1 | 2/2007 | Aoki et al. |
| 2007/0050157 A1 | 3/2007 | Kahn et al. |
| 2007/0061105 A1 | 3/2007 | Darley et al. |
| 2007/0063850 A1 | 3/2007 | Devaul et al. |
| 2007/0067094 A1 | 3/2007 | Park et al. |
| 2007/0073482 A1 | 3/2007 | Churchill et al. |
| 2007/0075127 A1 | 4/2007 | Rosenberg |
| 2007/0075965 A1 | 4/2007 | Huppi et al. |
| 2007/0078324 A1 | 4/2007 | Wijisiriwardana |
| 2007/0082789 A1 | 4/2007 | Nissila et al. |
| 2007/0102525 A1 | 5/2007 | Orr et al. |
| 2007/0106991 A1 | 5/2007 | Yoo |
| 2007/0125852 A1 | 6/2007 | Rosenberg |
| 2007/0130582 A1 | 6/2007 | Chang et al. |
| 2007/0142715 A1 | 6/2007 | Banet et al. |
| 2007/0143068 A1 | 6/2007 | Pasolini et al. |
| 2007/0145680 A1 | 6/2007 | Rosenberg |

(56) References Cited

U.S. PATENT DOCUMENTS

| | | |
|---|---|---|
| 2007/0150136 A1 | 6/2007 | Doll et al. |
| 2007/0156364 A1 | 7/2007 | Rothkopf |
| 2007/0161410 A1 | 7/2007 | Huang et al. |
| 2007/0165790 A1 | 7/2007 | Taori |
| 2007/0169126 A1 | 7/2007 | Todoroki et al. |
| 2007/0176898 A1 | 8/2007 | Suh |
| 2007/0192483 A1 | 8/2007 | Rezvani et al. |
| 2007/0195784 A1 | 8/2007 | Allen et al. |
| 2007/0208531 A1 | 9/2007 | Darley et al. |
| 2007/0208544 A1 | 9/2007 | Kulach et al. |
| 2007/0213085 A1 | 9/2007 | Fedora |
| 2007/0213126 A1 | 9/2007 | Deutsch et al. |
| 2007/0233788 A1 | 10/2007 | Bender |
| 2007/0239399 A1 | 10/2007 | Sheynblat et al. |
| 2007/0250261 A1 | 10/2007 | Soehren |
| 2007/0259685 A1 | 11/2007 | Engblom et al. |
| 2007/0259716 A1 | 11/2007 | Mattice et al. |
| 2007/0259717 A1 | 11/2007 | Mattice et al. |
| 2007/0260418 A1 | 11/2007 | Ladetto et al. |
| 2007/0260482 A1 | 11/2007 | Nurmela et al. |
| 2007/0263995 A1 | 11/2007 | Park et al. |
| 2007/0281762 A1 | 12/2007 | Barros et al. |
| 2007/0296696 A1* | 12/2007 | Nurmi .......................... 345/158 |
| 2008/0005738 A1 | 1/2008 | Imai et al. |
| 2008/0030586 A1 | 2/2008 | Helbing et al. |
| 2008/0046888 A1 | 2/2008 | Appaji |
| 2008/0052716 A1 | 2/2008 | Theurer |
| 2008/0072014 A1 | 3/2008 | Krishnan et al. |
| 2008/0082994 A1 | 4/2008 | Ito et al. |
| 2008/0102785 A1* | 5/2008 | Childress et al. .......... 455/404.1 |
| 2008/0113689 A1 | 5/2008 | Bailey |
| 2008/0140338 A1 | 6/2008 | No et al. |
| 2008/0153671 A1 | 6/2008 | Ogg et al. |
| 2008/0161072 A1 | 7/2008 | Lide et al. |
| 2008/0165022 A1 | 7/2008 | Herz et al. |
| 2008/0168361 A1 | 7/2008 | Forstall et al. |
| 2008/0171918 A1 | 7/2008 | Teller et al. |
| 2008/0214358 A1 | 9/2008 | Ogg et al. |
| 2008/0231713 A1 | 9/2008 | Florea et al. |
| 2008/0231714 A1 | 9/2008 | Estevez et al. |
| 2008/0232604 A1 | 9/2008 | Dufresne et al. |
| 2008/0243432 A1 | 10/2008 | Kato et al. |
| 2008/0303681 A1 | 12/2008 | Herz et al. |
| 2008/0311929 A1 | 12/2008 | Carro et al. |
| 2009/0017880 A1 | 1/2009 | Moore et al. |
| 2009/0031319 A1 | 1/2009 | Fecioru |
| 2009/0043531 A1 | 2/2009 | Kahn et al. |
| 2009/0047645 A1 | 2/2009 | Dibenedetto et al. |
| 2009/0067826 A1 | 3/2009 | Shinohara et al. |
| 2009/0088204 A1 | 4/2009 | Culbert et al. |
| 2009/0098880 A1 | 4/2009 | Lindquist |
| 2009/0099668 A1 | 4/2009 | Lehman et al. |
| 2009/0124348 A1 | 5/2009 | Yoseloff et al. |
| 2009/0128448 A1 | 5/2009 | Riechel |
| 2009/0174782 A1 | 7/2009 | Kahn et al. |
| 2009/0213002 A1 | 8/2009 | Rani et al. |
| 2009/0234614 A1 | 9/2009 | Kahn et al. |
| 2009/0274317 A1 | 11/2009 | Kahn et al. |
| 2009/0296951 A1 | 12/2009 | De Haan |
| 2009/0319221 A1 | 12/2009 | Kahn et al. |
| 2009/0325705 A1 | 12/2009 | Filer et al. |
| 2010/0056872 A1 | 3/2010 | Kahn et al. |
| 2010/0057398 A1 | 3/2010 | Darley et al. |
| 2010/0199189 A1 | 8/2010 | Ben-Aroya et al. |
| 2010/0245131 A1 | 9/2010 | Graumann |
| 2010/0277489 A1 | 11/2010 | Geisner et al. |
| 2010/0283742 A1 | 11/2010 | Lam |

FOREIGN PATENT DOCUMENTS

| | | |
|---|---|---|
| EP | 1271099 A2 | 1/2003 |
| GB | 2431813 A | 5/2007 |
| JP | 7020547 A | 1/1995 |
| JP | 2000-90069 | 3/2000 |
| JP | 2001-057695 | 2/2001 |
| JP | 2001-79699 | 3/2001 |
| JP | 2003-143683 | 5/2003 |
| JP | 2005-309691 | 11/2005 |
| JP | 2006-026092 | 2/2006 |
| JP | 2006-118909 | 5/2006 |
| JP | 2006-239398 | 9/2006 |
| JP | 2007-080219 | 3/2007 |
| JP | 2007-104670 | 4/2007 |
| JP | 2007-142611 | 6/2007 |
| JP | 2007-206748 | 8/2007 |
| JP | 2007-215784 | 8/2007 |
| JP | 2007-226855 | 9/2007 |
| JP | 2008-173248 | 7/2008 |
| WO | WO 99/22338 | 5/1999 |
| WO | WO 00/63874 | 10/2000 |
| WO | WO 02/088926 | 11/2002 |
| WO | WO 2006/008790 | 7/2004 |

OTHER PUBLICATIONS

PCT/US2008/079752, International Search Report and Written Opinion, Mailed Jan. 9, 2008.

"Access and Terminals (AT); Multimedia Message Service (MMS) for PSTN/ISDN; Multimedia Message Communication Between a Fixed Network Multimedia Message Terminal Equipment and a Multimedia Message Service Centre," ETSI AT-F Rapporteur Meeting, Feb. 4-6, 2003, Gothenburg, DES/AT-030023 V0.0.1 (Mar. 2003).

Anderson, Ian, et al, "Shakra: Tracking and Sharing Daily Activity Levels with Unaugmented Mobile Phones," Mobile Netw Appl, Aug. 3, 2007, pp. 185-199.

Ang, Wei Tech, et al, "Zero Phase Filtering for Active Compensation of Period Physiological Motion," Proc 1st IEEE / RAS-EMBS International Conference on Biomedical Robotics and Biomechatronics, Feb. 20-22, 2006, pp. 182-187.

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Baca, Arnold, et al, "Rapid Feedback Systems for Elite Sports Training," IEEE Pervasive Computing, Oct.-Dec. 2006, pp. 70-76.

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Bliley, Kara E, et al, "A Miniaturized Low Power Personal Motion Analysis Logger Utilizing MEMS Accelerometers and Low Power Microcontroller," IEEE EMBS Special Topic Conference on Microtechnologies in Medicine and Biology, May 12-15, 2005, pp. 92-93.

Bourzac, Katherine "Wearable Health Reports," Technology Review, Feb. 28, 2006, <http://www.techreview.com/printer_friendly_article_aspx?id+16431>, Mar. 22, 2007, 3 pages.

Cheng, et al, "Periodic Human Motion Description for Sports Video Databases," Proceedings of the Pattern Recognition, 2004, 8 pages.

Dao, Ricardo, "Inclination Sensing with Thermal Accelerometers", MEMSIC, May 2002, 3 pages.

"Decrease Processor Power Consumption using a CoolRunner CPLD," Xilinx XAPP347 (v1.0), May 16, 2001, 9 pages.

Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.

Healey, Jennifer, et al, "Wearable Wellness Monitoring Using ECG and Accelerometer Data," IEEE Int. Symposium on Wearable Computers (ISWC'05), 2005, 2 pages.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Jones, L, et al, "Wireless Physiological Sensor System for Ambulatory Use," <http://ieeexplore.ieee.org/xpl/freeabs_all.jsp?tp=&arnumber=1612917&isnumber=33861>, Apr. 3-5, 2006, 1 page.

(56) References Cited

OTHER PUBLICATIONS

Jovanov, Emil, et al, "A Wireless Body Area Network of Intelligent Motion Sensors for Computer Assisted Physical Rehabilitation," Journal of NeuroEngineering and Rehabilitation, Mar. 2005, 10 pages.

Kalpaxis, Alex, "Wireless Temporal-Spatial Human Mobility Analysis Using Real-Time Three Dimensional Acceleration Data," IEEE Intl. Multi-Conf. on Computing in Global IT (ICCGI'07), 2007, 7 pages.

Lee, Hyunseok, et al, A Dual Processor Solution for the MAC Layer of a Software Defined Radio Terminal, Advanced Computer Architecture Laboratory, University of Michigan, 25 pages, Apr. 14, 2009.

Lee, Seon-Woo, et al., "Recognition of Walking Behaviors for Pedestrian Navigation," ATR Media Integration & Communications Research Laboratories, Kyoto, Japan, pp. 1152-1155, Sep. 2001.

Margaria, Rodolfo, "Biomechanics and Energetics of Muscular Exercise", Chapter 3, Oxford: Clarendon Press 1976, pp. 105-125.

Milenkovic, Milena, et al, "An Accelerometer-Based Physical Rehabilitation System," IEEE SouthEastern Symposium on System Theory, 2002, pp. 57-60.

Mizell, David, "Using Gravity to Estimate Accelerometer Orientation", Seventh IEEE International Symposium on Wearable Computers, 2003, 2 pages.

Ormoneit, D, et al, Learning and Tracking of Cyclic Human Motion: Proceedings of NIPS 2000, Neural Information Processing Systems, 2000, Denver, CO, pp. 894-900.

Otto, Chris, et al, "System Architecture of a Wireless Body Area Sensor Network for Ubiquitous Health Monitoring," Journal of Mobile Multimedia, vol. 1, No. 4, 2006, pp. 307-326.

Park, Chulsung, et al, "Eco: An Ultra-Compact Low-Power Wireless Sensor Node for Real-Time Motion Monitoring," IEEE Int. Symp. on Information Processing in Sensor Networks, 2005, pp. 398-403.

Ricoh, "Advanced digital technology changes creativity," <http://www.ricoh.com/r_dc/gx/gx200/features2.html>, Accessed May 12, 2011, 4 pages.

"Sensor Fusion," <www.u-dynamics.com>, accessed Aug. 29, 2008, 2 pages.

Shen, Chien-Lung, et al, "Wearable Band Using a Fabric-Based Sensor for Exercise ECG Monitoring," IEEE Int. Symp. on Wearable Computers, 2006, 2 pages.

Tapia, Emmanuel Munguia, et al, "Real-Time Recognition of Physical Activities and Their Intensities Using Wireless Accelerometers and a Heart Rate Monitor," IEEE Cont. on Wearable Computers, Oct. 2007, 4 pages.

Tech, Ang Wei, "Real-time Image Stabilizer," <http://www.mae.ntu.edu.sg/ABOUTMAE/DIVISIONS/RRC_BIOROBOTICS/Pages/rtimage.aspx>, Mar. 23, 2009, 3 pages.

Wang, Shu, et al, "Location Based Services for Mobiles: Technologies and Standards, LG Electronics MobileComm," IEEE ICC 2008, Beijing, pp. 1-66 (part 1 of 3).

Wang, Shu, et al, "Location Based Services for Mobiles: Technologies and Standards, LG Electronics MobileComm," IEEE ICC 2008, Beijing, pp. 67-92 (part 2 of 3).

Wang, Shu, et al, "Location Based Services for Mobiles: Technologies and Standards, LG Electronics MobileComm," IEEE ICC 2008, Beijing, pp. 93-123 (part 3 of 3).

Weckesser, P, et al, "Multiple Sensorprocessing for High-Precision Navigation and Environmental Modeling with a Mobile Robot," IEEE, 1995, pp. 453-458.

Weinberg, Harvey, "MEMS Motion Sensors Boost Handset Reliability" Jun. 2006, <http://www.mwrf.com/Articles/Print.cfm?ArticleID=12740>, Feb. 21, 2007, 3 pages.

Weinberg, Harvey, "Minimizing Power Consumption of iMEMS® Accelerometers," Analog Devices, <http://www.analog.com/static/imported-files/application_notes/5935151853362884599AN601.pdf>, 2002, 5 pages.

Wixted, Andrew J, et al, "Measurement of Energy Expenditure in Elite Athletes Using MEMS-Based Triaxial Accelerometers," IEEE Sensors Journal, vol. 7, No. 4, Apr. 2007, pp. 481-488.

Wu, Winston H, et al, "Context-Aware Sensing of Physiological Signals," IEEE Int. Conf. on Engineering for Medicine and Biology, Aug. 23-26, 2007, pp. 5271-5275.

Yoo, Chang-Sun, et al, "Low Cost GPS/INS Sensor Fusion System for UAV Navigation," IEEE, 2003, 9 pages.

Zypad WL 1100 Wearable Computer, http://www.eurotech.fi/products/manuals/Zypad%20WL%201100_sf.pdf, Jan. 16, 2008, 2 pgs.

\* cited by examiner

METHOD AND APPARATUS FOR UTILIZING MOTION USER INTERFACE

RELATED APPLICATIONS

The present invention relates to U.S. Provisional Application Ser. No. 60/830,205, filed on Jul. 11, 2006, and incorporates that application in its entirety.

FIELD OF THE INVENTION

The present invention relates to accelerometers, and more particularly to using gestures in a mobile device.

BACKGROUND

Accelerometers are becoming cheaper and more ubiquitous. Numerous mobile devices include accelerometers. For example, SAMSUNG SPH-54000 and SCH-5400 phones feature gesture recognition, enabling a user to control its functionality by moving it. There is an accelerometer built into the phone, and a user can skip songs on its MP3 player by shaking the phone from side to side, or play games by shaking the phone, rather than using a more traditional joystick. However, there are numerous problems with this interface, including the issue regarding accidental shakes. As commentators point out, if shaking the device skips songs, then jogging with the telephone would cause random skipping whenever the device was accidentally shaken right or left by the user's motions.

SUMMARY OF THE INVENTION

A method or apparatus to utilize motion data for interacting with a mobile device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is for the use of motions or gestures as a user interface. The gestures, or motions, enable a user to navigate in a computing device in various ways. In one embodiment, the navigation may be for a mobile device, such as a cellular telephone, MP3 player, or other such device. In another embodiment, the navigation may be for a non-mobile device, such as a stationary computer utilizing a mobile controller, such as a mouse. The gestures or motions are detected using an embedded or wirelessly tethered accelerometer, in one embodiment. The accelerometer is also used to detect a user's activity level, in one embodiment.

The system provides the ability to interact with a device using pre-defined gestures or motion series. The system further provides the ability for a user to define interaction gestures that are preferred by the user, and are not likely to be problematic (i.e. accidentally made). Furthermore, in one embodiment, the gesture interface interacts with spoken or displayed menu items, to provide a gesture interface in loud environments.

In one embodiment, the system further modifies and/or turns off certain motion gestures, based on current activities. For example, in one embodiment, certain gesture recognition algorithms are adjusted or shut off entirely when the user is walking, biking, or running above a certain cadence. This is useful because it permits the recognition of a gesture that is easy to perform when a user is sitting holding the device, and yet ensures that the command is not accidentally set off when the user is running. For example, tapping on a device may be used as a user interface command for controlling the mobile device or an application within the mobile device. When jogging or running, the mobile device may knock against the user's leg if in a shorts pocket, on other objects in a handbag, etc. To solve this challenge, the gesture detection algorithm may be modified as the user's cadence increases so as not to be falsely triggered by the motions associated with the activity of the user.

Figure 1:
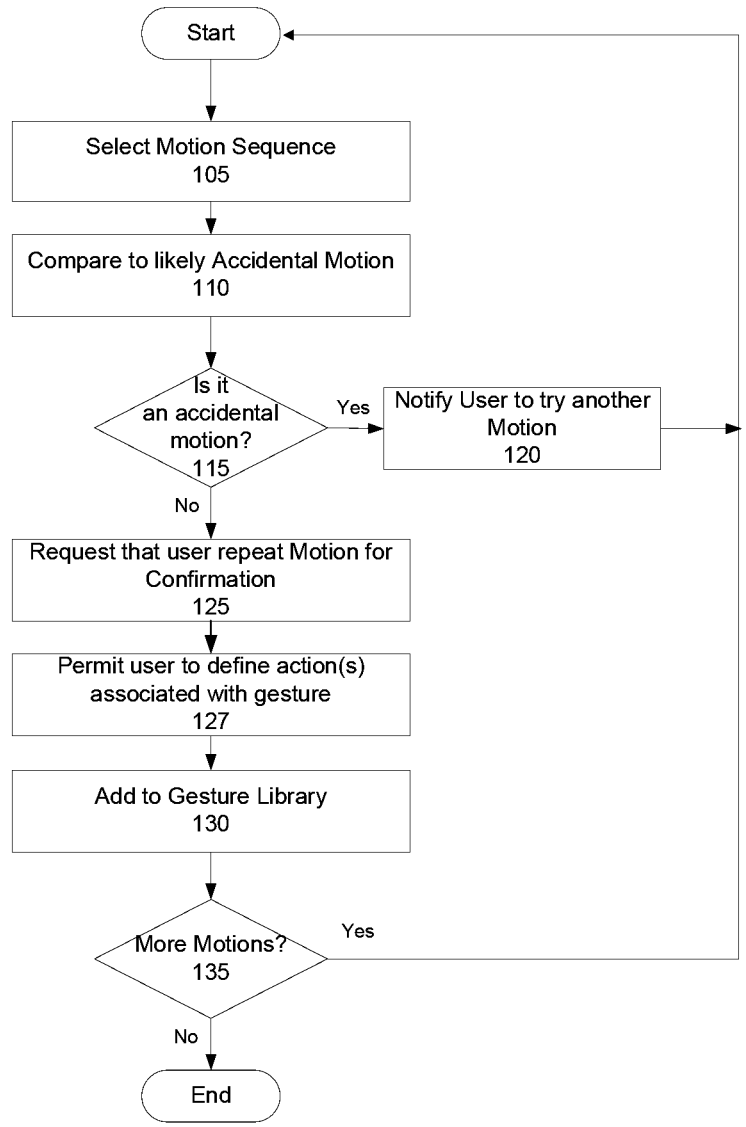
FIG. 1 is a flowchart of one embodiment of training a device with motions.

FIG. 1 is a flowchart of one embodiment of training a device with motions. The process starts when a user attempts to train a device including the mobile user interface. In one embodiment, the process is automatically initiated when the user initializes the device. In one embodiment, the user may trigger the training process at any time.

At block 105, the user selects a suggested motion sequence. In one embodiment, the user does this by indicating the start of a motion sequence, performing the motion sequence, and indicating the end of the motion sequence. In one embodiment, the motion sequence may include more than one motion, or one complex motion.

At block 110, the process compares the suggested motion sequence to known accidental motion patterns. Accidental motion patterns include motions likely to be accidentally performed when walking, running, talking if it is mobile phone, or another activity likely to be performed by the user with the mobile component, as well as existing registered gesture sequences. It would be any motion that the user may make, that may trigger the command associated with the suggested motion.

At block 115, the process determines whether the suggested motion sequence is too similar to an accidental motion. In one embodiment, the comparison takes into account the movement type, speed, and accelerations of the motion pattern suggested. If the motion is too similar, the user is prompted to try another motion sequence. In one embodiment, the user is informed of the reason for the similarity. For example, the user may be informed that "the up-down motion resembles jogging or similar accidental motion, please select an alternative pattern." In one embodiment, the system may further provide suggestions. For example, the suggestion may be to "change the speed/angle/range of motion" to avoid similarity.

If the motion sequence is not too similar to an accidental motion, the process continues to block 125. At block 125, the user is requested to repeat the motion for confirmation. In one embodiment, if the two repetitions of the motion are too dissimilar, the user is requested to repeat the motion again. If the motions continue to be too dissimilar, the motion sequence is discarded as too difficult, and the user is requested to select another motion sequence.

If the repeated motions match properly, at block 127, the user is permitted to define one or more actions associated with the gesture. The actions may range from an emergency response, to dialing a particular number (defined by the user), making an item selection among a set of menu items, listing menu items on the display or via a speaker, activating an application, or any other definable action. In one embodiment, the action may relate to the mobile device as a whole, and/or to a particular application within the mobile device. In one embodiment, the user may define different actions depending on the currently active application. Thus, for example, in a music application a rapid tilt to the side may mean "advance to next song" while in the address book application the same rapid tilt to the side may mean "scroll one screen to next set of addresses."

At block 130, the gesture and its associated action(s) are added to the gesture library. The user can, at block 135, decide to add another motion sequence to the gesture library. If the user chooses to do so, the process returns to block 105. Otherwise, the process ends. In one embodiment, a gesture may be defined not only for a particular application, but also for a particular background activity, ambient noise, or user's motion cadence. In one embodiment, the user may define separate gestures associated with the same command based on any of these features. For example, if the user is jogging he or she may not want to use a gesture that involves rapid shaking up and down, and my instead define a different gesture to use as a command. In one embodiment, such separate gestures are provided in the default set of gestures as well.

Figure 2:
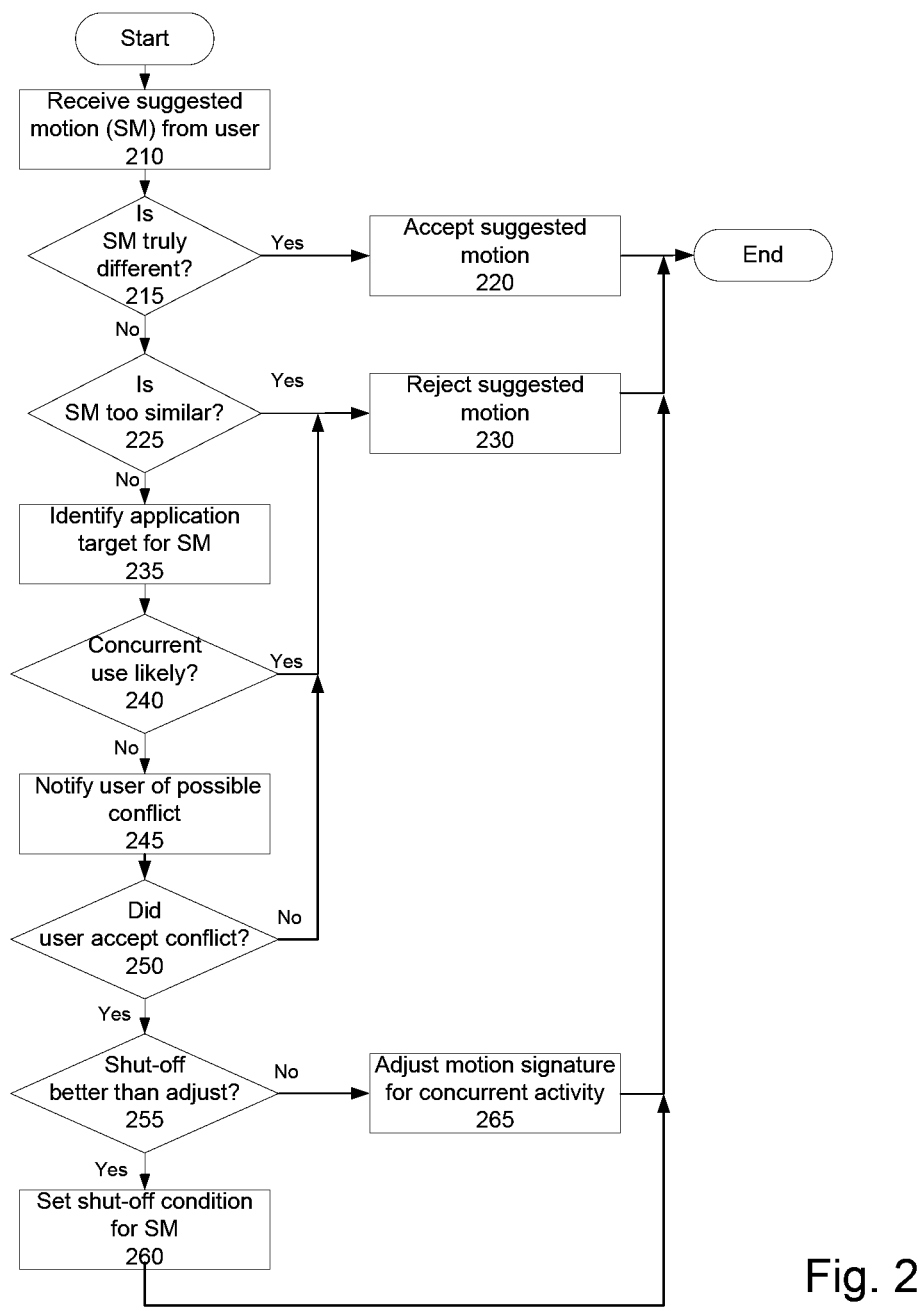
FIG. 2 is a flowchart of one embodiment of selecting a gesture for the gesture library.

FIG. 2 is a flowchart of one embodiment of determining whether a gesture is too similar to an accidental motion. In one embodiment, this corresponds to block 115 in FIG. 1.

The process starts at block 210, when a suggested motion is received from the user for analysis. In one embodiment, the system includes a library of accidental motions. In one embodiment, this library of accidental motions is added-to as the device is utilized. For example, for someone who sprints, the accidental motions are different from someone who primarily does race walking. In one embodiment, the library of motions includes a list of activities. The user may, in one embodiment, select the set of activities performed with the mobile device.

At block 215, the process determines whether the suggested motion is dissimilar from accidental motions which may be accidentally made or made intended to activate a different command. If so, at block 220, the motion is accepted. In one embodiment, this requires that the motion be clearly non-conflicting. If the motion is not clearly non-conflicting, the process continues to block 225.

At block 225, the process determines whether the suggested motion is similar to a "standard" movement, which is performed during a normal course of action. For example, for a mobile phone, standard movements include walking, sitting, and other activities which a user is expected to perform all the time. These "standard" movements ensure that the motion would be a problem under normal circumstances. Therefore, the motion cannot be accepted. If so, at block 230, the motion is rejected.

Otherwise, at block 235, the process obtains identification of the application/command associated with the suggested motion. In one embodiment, the user first identifies the application/command, and then provides the motion. In another embodiment, the user first provides the application/command, and then the suggested motion. In another embodiment, the process requests the application/command only when the motion isn't similar to a standard movement, but isn't dissimilar enough from possible movements to be an automatic pass.

At block 240, the process determines whether the application/command is likely to be utilized concurrently with the interfering base activity. For example, a user is likely to utilize commands associated with a music player while jogging, but is unlikely to play an electronic bowling game while jogging. If they are likely to be utilized concurrently, the process continues to block 230, and rejects the suggested motion. If there is likely concurrent use, the process continues to block 230, and rejects the suggested motion.

If the commands are not likely to be utilized concurrently, at block 245 the process notifies the user of the potential conflict, and allows the user to accept the conflict. At block 250, the process determines whether the user is willing to accept the conflict. If not, the process continues to block 230 and rejects the suggested motion. Otherwise, the process continues to block 250.

At block 255, the process determines whether it would be better to shut down the availability of the motion sequence command when the interfering activity is occurring. For example, if the command is for a game, if the underlying activity is jogging, it may be best to turn off the availability of the command when the user is jogging. If so, at block 260, the system sets up a condition such that the motion command is not available when certain activity is occurring. For example, the tapping to access a particular game menu may be unavailable when the system determines that the user is jogging.

Otherwise, in one embodiment, the motion signature is adjusted for the activity, at block 265. The process then ends, at block 270.

Figure 3A:
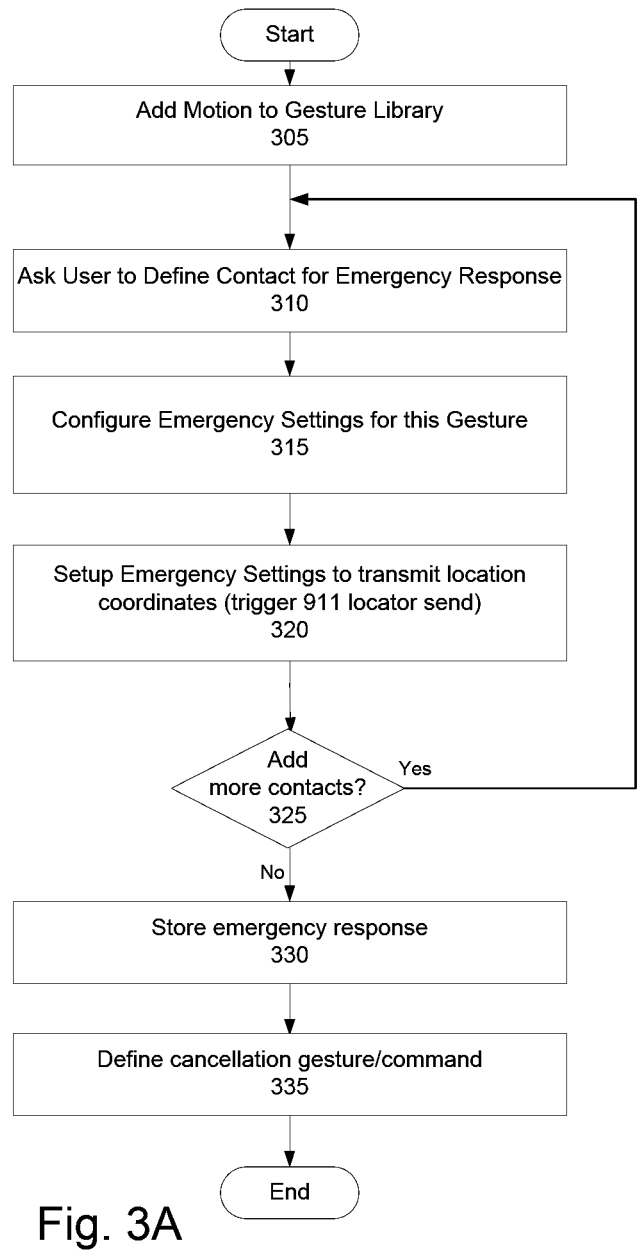
FIG. 3A is a flowchart of one embodiment of setting up an emergency response.

FIG. 3A is a flowchart of one embodiment of setting up an emergency response using the gesture interface, for a mobile telephone. One of the motion sequences which may be set up by the user is an "emergency" motion sequence. The emergency motion sequence is designed to be activated by the user in an emergency when calling 911 and talking to a dispatcher directly may be too difficult or dangerous. It is designed, in one embodiment, to be usable without alerting bystanders or possible dangerous elements.

In one embodiment, the user is prompted to utilize an easy to remember motion sequence. For example, the system may suggest a beat from a song the user is familiar with, or their favorite dance move, or something similar. In one embodiment, the system further suggests that the user select a motion that can be done unobtrusively. For example, windmilling the arms may not be the best motion sequence because it is so obvious that the user is making an unnatural motion. However, the motion sequence should be one that will not be accidentally activated by the user's normal actions.

Once the motion is defined—in one embodiment the process described above with respect to FIGS. 1 and 2 is used— the process adds the motion to the gesture library, at block 305.

At block 310, the user is asked to define a first contact for emergency response. In one embodiment, the default first contact is the local police emergency number. In one embodiment, that number may be 911. In another embodiment, the user's local number is utilized, because calling 911 in some mobile devices connects to a central service center which may not be local to the user. In one embodiment, if the mobile device includes a GPS (global positioning system) or other location-determination mechanism, a local emergency number is identified and used.

At block 315, the emergency settings are configured for this gesture. In one embodiment, the user may choose to change any of the default configurations. In one embodiment, the default configuration is to transmit audio, but mute incoming audio, so that it is not obvious that sounds are being transmitted. Alternatively, the configuration may be to set the telephone to act as a speaker phone, broadcasting tone as well as receiving. In one embodiment the emergency setting may also include a short audio message indicating that this is an emergency connection to whatever agency receives the call.

At block 320, the emergency settings are set to transmit location coordinates, if the emergency contact is capable of receiving such data, and the mobile device has the capability of obtaining the data. In one embodiment, the user may define the location. In one embodiment, the data may be based on GPS (global positioning system) data, if the mobile device includes this feature. In one embodiment, the data may be based on wireless locator data. In one embodiment, the data may be based on network triangulation data.

The user is then queried whether he or she wishes to add an additional contact to the emergency response, at block 325. If so, the process returns to block 310, to add additional contacts. In one embodiment, the system connects to multiple contacts simultaneously, if multiple contacts are designated and the device is capable of conference calls. Alternatively, the contacts may be sequential. In one embodiment, if the contacts are sequential, the order of the contacts may be specified by the user. At block 330, the emergency response is stored.

At block 335 the process provides the opportunity for the user to define a cancellation gesture or command. The cancellation gesture/command is designed to enable the user to cancel the emergency response, if it was accidentally triggered. In one embodiment, the cancellation command may be a numeric pass code. The process then ends.

Figure 3B:
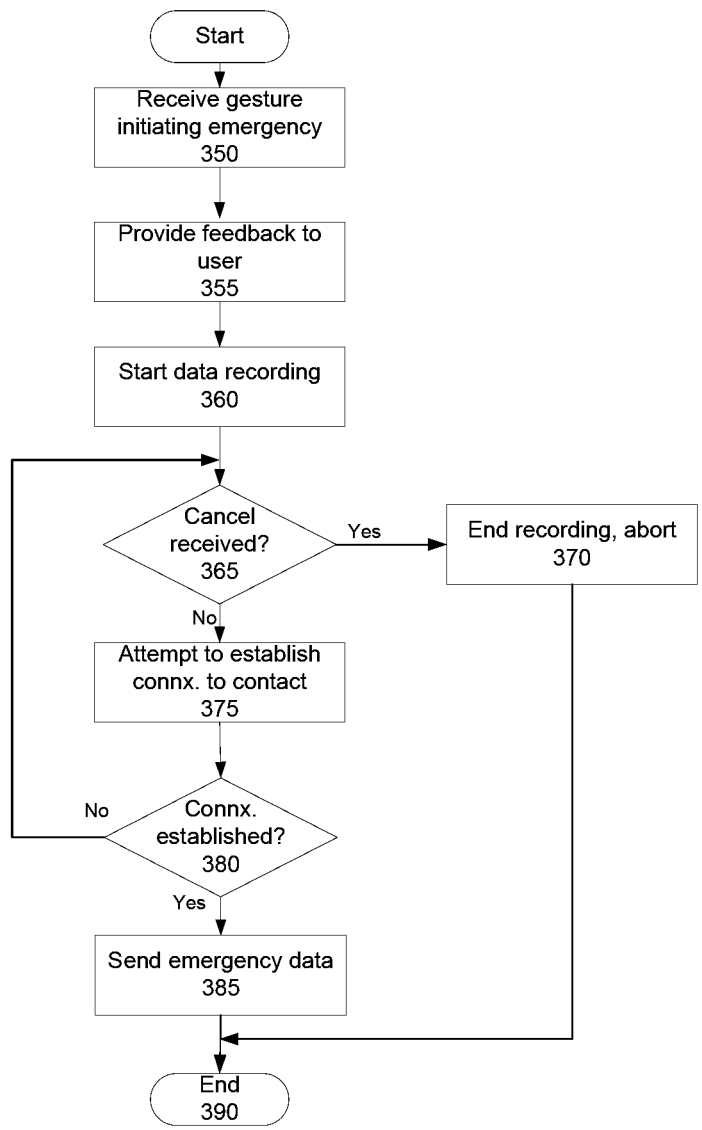
FIG. 3B is a flowchart of one embodiment of the use of the emergency response.

FIG. 3B is a flowchart of one embodiment of using the emergency response system. The process starts when the gesture initiating the emergency response is identified, at block 350.

At block 355, feedback is provided to the user indicating that the emergency gesture was received. In one embodiment, this feedback is designed to be non-obtrusive, quiet, so as to communicate only to the user. In one embodiment, the feedback may be auditory, visual, or tactile (such as vibration), or a combination of the above.

At block 360, the device starts recording data. This occurs, in one embodiment, substantially immediately after detection of the emergency gesture. The recording, in one embodiment, may include recording of audio data, video data, image data, movement data, and/or data from other sensors within the device. If location data is available—through GPS, network triangulation, or another source—that data is also recorded.

In one embodiment, the recording is stored in a "black box" system. This ensures that the data is not trivially erasable, and in one embodiment is designed to keep the data stored even if the mobile device is broken. In one embodiment, the data from the emergency recording can only be erased with the use of a security key, known to the user.

At block 365, the process determines whether a cancellation gesture/command was received. In one embodiment, the user is given a short amount of time to cancel the emergency response.

If a cancellation signal was given, at block 370 the recording is terminated, and the process is aborted. The process then ends at block 390. In one embodiment, the user is able to erase the recorded data from the black box. If no cancellation is given, the process continues to block 375.

At 375, the system attempts to establish a connection to the designated emergency contacts over any available channel, to send out a call for help. In one embodiment, this includes switching to roaming, sending data over WiFi (wireless connection) if so enabled, sending data via WAP (wireless access protocol), as well as sending data via the more traditional carrier network.

At block 380, the process determines whether the connection has been established. If not, the system continues trying, until either the user terminates the emergency, or a connection is established.

At block 385, once the connection is established, the emergency data is sent to the contact. As noted above, generally the contact would be local law enforcement or emergency response team or dispatcher. In one embodiment, an initial notification message is transmitted, which indicates that this is an emergency and the location of the user if available, and then initiates live audio/video broadcast to give the emergency response team/dispatcher additional information. In one embodiment, the location information may be converted by the system from the GPS data/network triangulation data into location data. In one embodiment, if the emergency contact's system is capable of it, the user's system may provide a data dump of collected information—i.e. recorded information that was collected prior to the connection being established. In one embodiment, the data continues being sent until either the user aborts the process, the contact aborts the process, or the device can no longer maintain a connection. In one embodiment, if the connection is lost, and the user has not aborted the emergency, the process attempts to establish a new connection.

In this way, the user is provided an emergency response mechanism which can be easily activated and provides added security.

Figure 4:
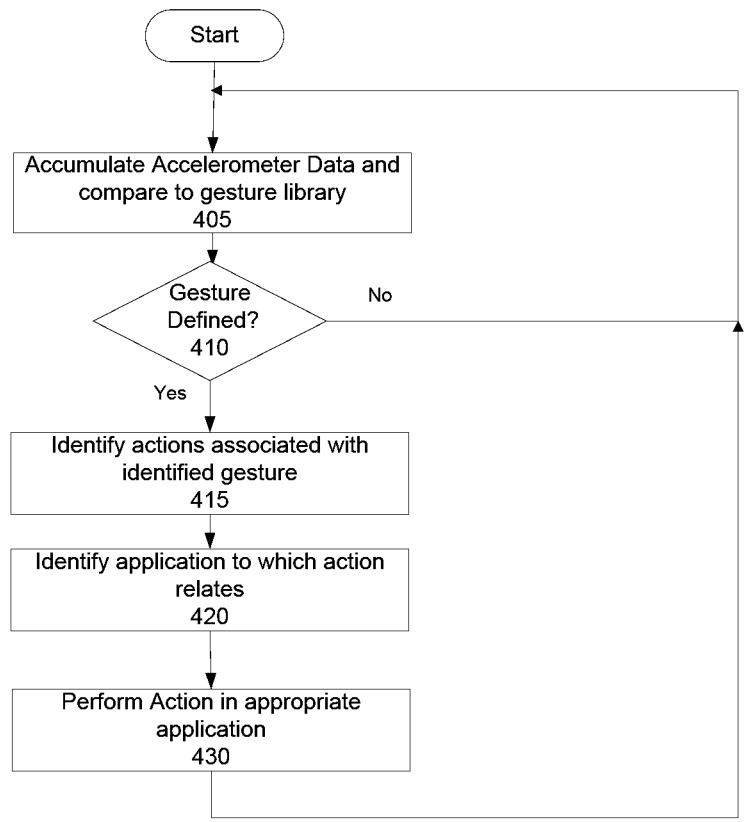
FIG. 4 is a flowchart of one embodiment of using the system.

FIG. 4 is a flowchart of one embodiment of using the system. The process is utilized whenever the gesture user interface is active. At block 405, accelerometer data is accumulated. In one embodiment, this accumulation is always active. In another embodiment, the accumulation is active only when there is at least one active application that uses the accelerometer data.

At block 410, the process determines whether a gesture has been defined by the accelerometer data. In one embodiment, the system includes one or more default gestures provided with the system. In one embodiment, for a mobile handset these gestures may include gestures for picking up the telephone. One example of a gesture that may be provided is described in U.S. Patent Application Ser. No. 60/948,434. As noted above, the user may also record one or more gestures during the set-up phase. In one embodiment, the user may remove or modify any of the default gestures. In one embodiment, the system continuously compares the recorded gesture data to the accumulated accelerometer data. If no gesture has been defined, the process continues to accumulate data, and make the comparison.

If a gesture has been recognized, the process continues to block 415. At block 415, the actions associated with the defined gesture are identified. These actions may include the emergency response discussed above, dialing a particular number, or any other action as defined by the user.

At block 420, the process identifies the active application to which the gesture relates. At block 430, the action is performed in the designated application. The process then returns to block 405, to continue accumulating accelerometer data.

Figure 5:
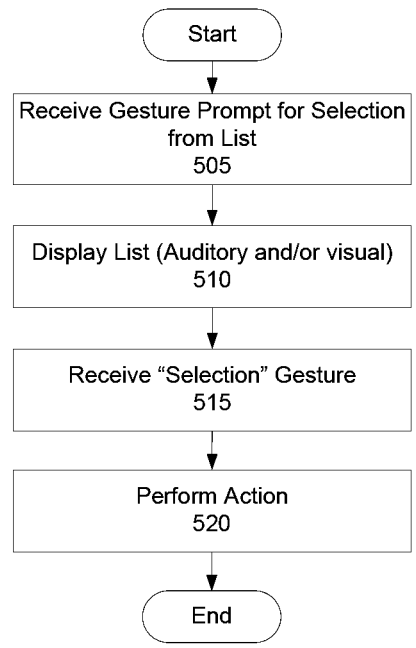
FIG. 5 is a flowchart of another embodiment of using the system.

FIG. 5 is a flowchart of another embodiment of using the system. In one embodiment, the gestures may be used not to initiate an action, but to react to a particular type of display or interaction from the mobile system. For example, at block 505, the user may initiate a display of a list (such as a list of names and numbers in a telephone book). The display may be initiated via gesture, spoken command, menu selections, or other means.

At block 510, the system displays the list, via auditory and/or visual output. The user can then utilize a "selection gesture," at block 515. The selection gesture is defined by a user during training of a phone.

At block 520, the action associated with the listed item which was selected by the user is performed.

The gesture interface is especially useful in loud and badly lit environments, for example shop floors or clubs where spoken commands impossible, and visually making a selection is also difficult. It can also be useful for individuals with strong accents who have difficulty training word recognition. Gesture recognition is much easier to train, since the user can simply define any gesture to correspond to a particular type of action.

Figure 6A:
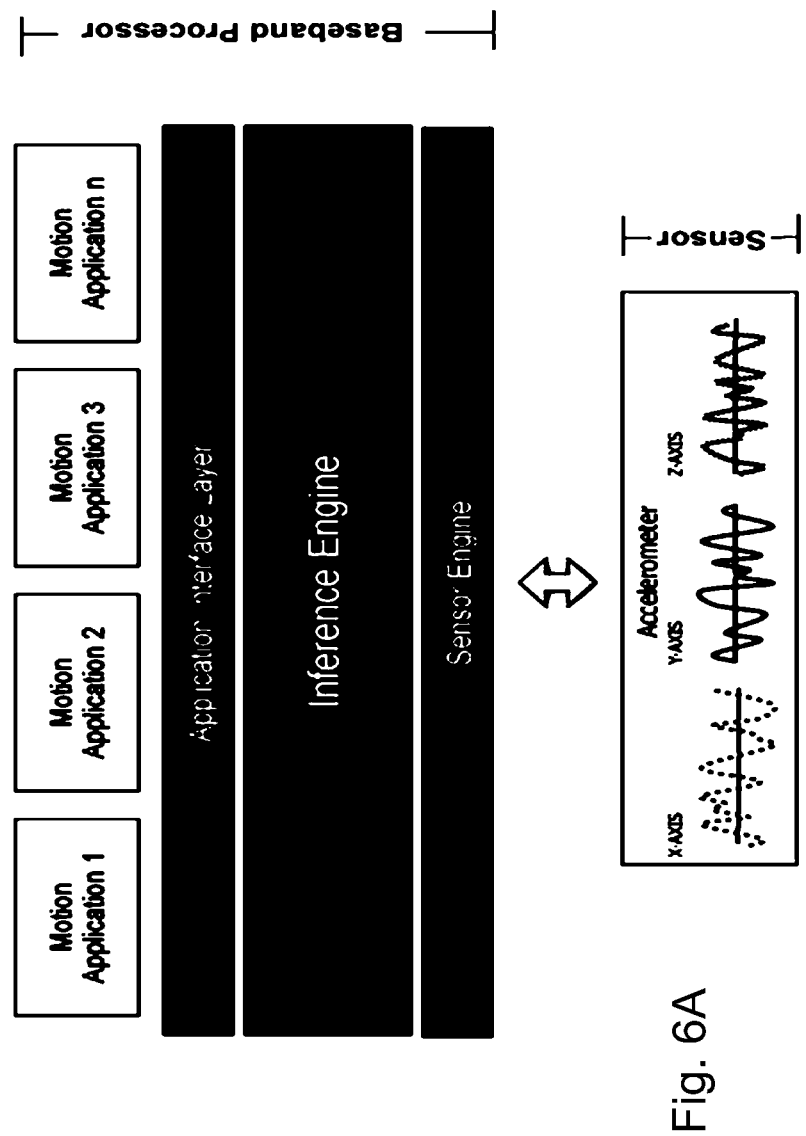
FIG. 6A is a device architecture diagram illustrating an exemplary network configuration which may be used with the present invention.

FIG. 6A is a device architecture diagram illustrating an exemplary network configuration which may be used with the present invention. FIG. 6 shows the structure in which the device that includes the accelerometer does not have a native processor. Instead, a main processor on the device interfaces with the sensor. Under this architecture, in one embodiment, the accelerometer may not be sampled at very high rates for long periods of time due to power consumption.

The sensor engine interfaces with the sensor, and controls the sampling rate etc. The inference engine does all other processing, in one embodiment. This processing includes step counting, gesture recognition, etc. In one embodiment, the inference engine resolves complex raw motion data into organized, actionable information.

Figure 6B:
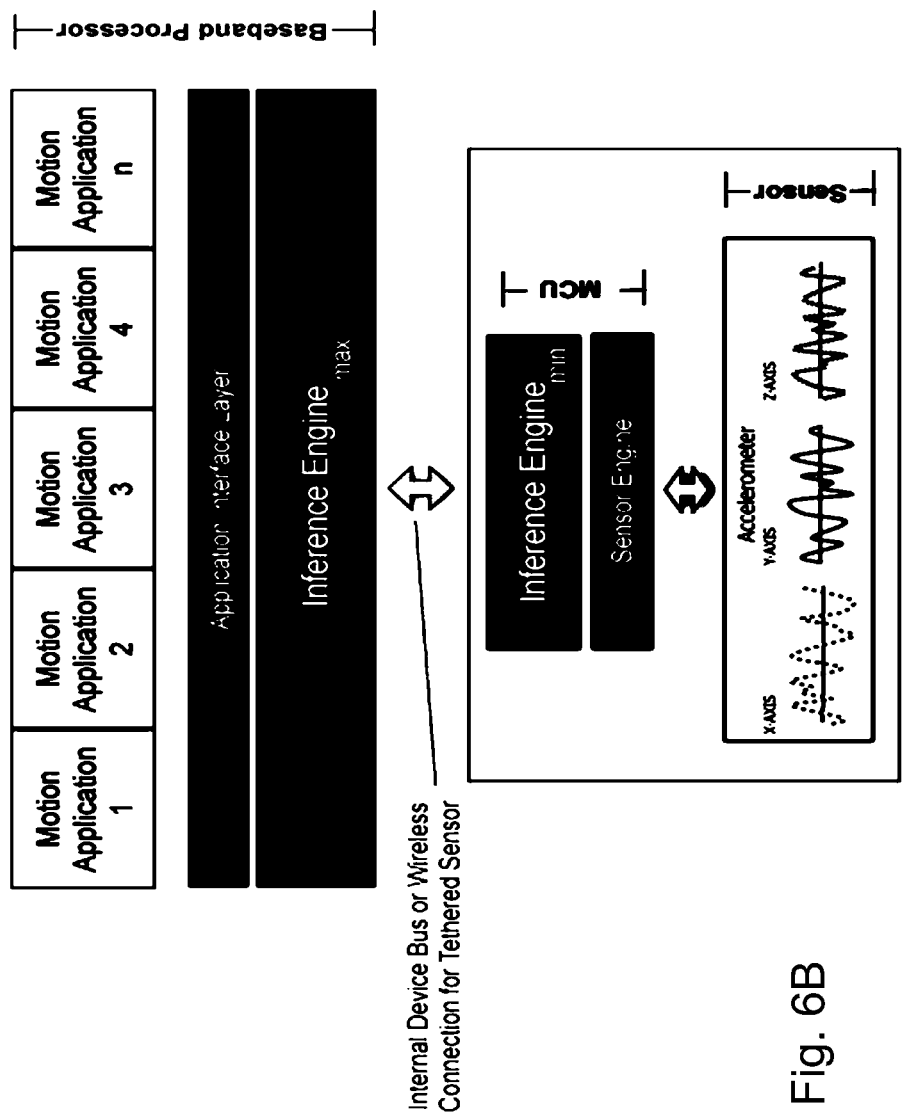
FIG. 6B is a device architecture diagram of an alternative network configuration which may be used with the present invention.

FIG. 6B is a block diagram of one embodiment of a device architecture diagram. FIG. 6B shows an architecture in which the handheld device includes processing. This can be used in a scenario with a wirelessly tethered sensor (say a chest strap, mouse, etc.) or in a case where the MCU and the sensor both integrated in the device.

Under this architecture, the inference engine is divided into two components: min and max. The data analysis and computing is split between the MCU integrated with the accelerometer (min) and the main processor (max). In one embodiment, low complexity and high speed processing is done on the MCU and other more processor intensive computations are resolved on the main processor.

These are merely exemplary architectures. As is understood in the art, since none of these processes must be truly instantaneous, the processing may be performed remotely, and may be divided among the various devices and processors based on available processing power, speed requirements, and network availability and speed. In one embodiment, the handheld device may be an independent device, providing all processing during use.

Figure 7:
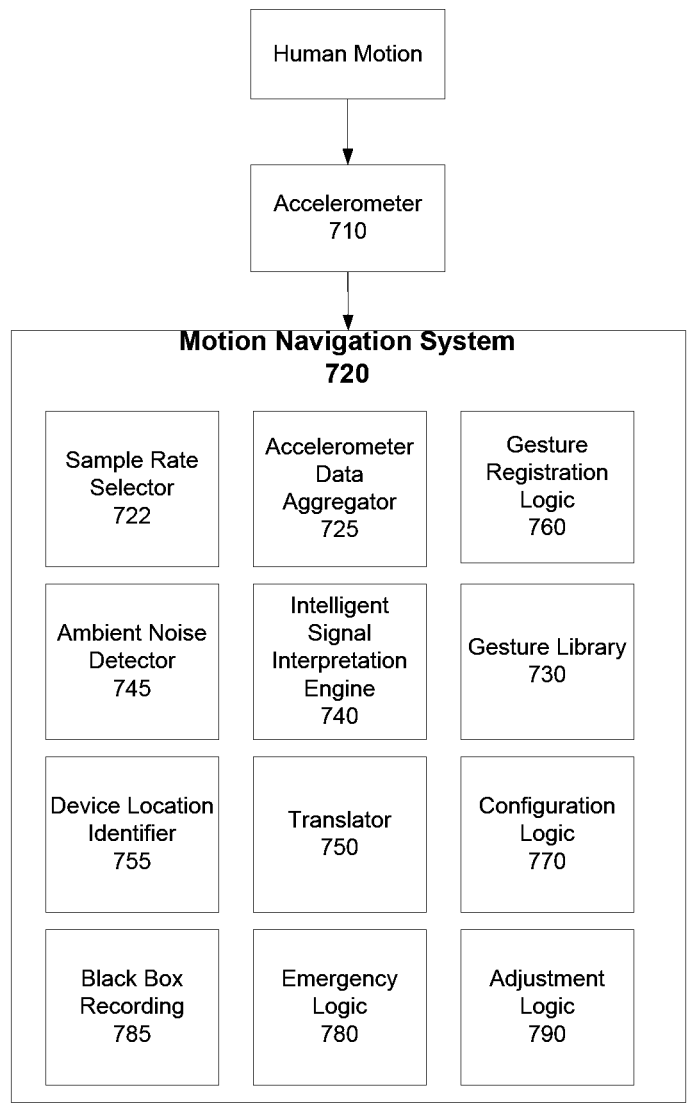
FIG. 7 is a block diagram of one embodiment of the motion navigation system.

FIG. 7 is a block diagram of one embodiment of the motion navigation system. Data from accelerometer 710 is fed into the motion navigation system 720. The motion navigation system 720 includes data aggregator 725, to aggregate the accelerometer data. Intelligent signal interpretation engine (ISIE) 740 utilizes the aggregated accelerometer data, and the gesture data in the gesture library to determine whether the recorded accelerometer data corresponds to a gesture. In one embodiment, an adjustment logic 790 determines whether the identified gesture is currently available, i.e. has not be shut off. In one embodiment, the ISIE 740 also receives ambient noise data from ambient noise logic 745. Ambient noise includes any jiggling, shaking, or other motion which is "background noise." In one embodiment, people have an ambient noise level under various conditions, such as walking, talking, and even breathing deeply. Ambient noise cannot be removed from the accelerometer data, but in one embodiment the ISIE 740 can modify the recognition algorithms, depending on ambient noise level.

In one embodiment, the ambient noise level is a variable that is input in the gesture detection algorithm and is used to scale the magnitude of the gesture, i.e. if there is a lot of ambient noise, then a relatively large (more pronounced gesture) is necessary than if the device very still.

Similarly with the user's cadence when walking/jogging/running. The cadence is an input into the gesture recognition algorithms of the ISIE 740, and that input adjusts the gesture. In one embodiment, the cadence may change the gesture entirely, to a different gesture that's practical when running at that cadence.

In one embodiment, device location identifier 755 can tell from the motion signature of walking or other regular motions where the device is located. In one embodiment, this data is used by ISIE 740 to modify the gesture algorithm based on the devices location.

If the ISIE 740 identifies a gesture, and the gesture is available, the corresponding actions are retrieved from the gesture library 730. Translator 750 then translates the identified actions into commands for the mobile device.

In one embodiment, the gesture library 730 is populated by the user, using gesture registration logic 760. Gesture registration logic enables a user to define a motion, gesture, or set of motions, and associate one or more actions with the gesture. In one embodiment, the actions may be a series of actions. For example, a single motion may be used to dial a particular number, enter a passcode, and start playing a game.

Configuration logic 770, in one embodiment, allows the user to define actions which change the mobile device's configuration. For example, the emergency response may be to configure the mobile telephone to be a speaker phone, and set the volume to the maximum available volume. Configuration logic 770 interacts with the mobile device's settings, so the user may change the phone's configuration via gesture. For example, one of the defined gestures may change the mobile device's settings from "outdoors" to "meeting" without requiring the user to fuss with their telephone during a meeting.

Emergency logic 780 provides the special features associated with emergency gestures. This may include setting up a conference to enable the phone dial all identified parties substantially concurrently, providing a recorded outgoing message, turning off the incoming audio, etc. Emergency logic 780 is coupled to black box recorder 785, which provides a location to store the emergency record.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A motion navigation system comprising:
   an intelligent signal interpretation engine (ISIE) to receive motion data and to compare the motion data to registered motions corresponding to a gesture, and reject the motion data when the motion data does not match any the registered motions, and to identify a gesture based on the motion data when the motion data matches the registered motions;
   a gesture library to associate the gesture with an action;
   a gesture registration logic to enable a user to add a new gesture to the gesture library, the gesture registration logic to compare a suggested gesture to a subset of known accidental motion patterns associated with activities that may be concurrent with the action associated with the suggested gesture prior to adding the suggested gesture to the gesture library as the new gesture, and to reject the suggested gesture when the suggested gesture matches any known accidental motion pattern in the subset of the known accidental motion patterns informing the user of the rejection and enabling the user to override the rejection and add the suggested gesture to the gesture library; and
   a translator to generate one or more commands to execute the action associated with the gesture.

2. The system of claim 1, wherein the gesture registration logic is further to compare the suggested gesture to previously registered gestures.

3. The system of claim 1, further comprising:
   an adjustment logic to identify an ambient noise level in the accelerometer data, and to adjust the gesture library to account for the ambient noise level.

4. The system of claim 1, further comprising:
   an adjustment logic to identify a cadence of motion of the user, and to adjust the gesture library to account for the cadence of motion.

5. The system of claim 1, further comprising:
   an adjustment logic to turn off availability of a gesture, when the gesture conflicts with a current activity level of the user.

6. The system of claim 5, wherein the gesture is only permitted registration when the current activity level and a command associated with the gesture do not occur concurrently.

7. The system of claim 1, further comprising:
   an emergency logic to initiate an emergency process when an unobtrusive emergency gesture is received, the unobtrusive gesture designed to be difficult to observe by a third party.

8. The system of claim 7, further comprising:
   a black box recorder to automatically initiate a full recording of data in a secure store on the device when the emergency logic initiates an emergency.

9. The system of claim 8, wherein the data comprises one or more of the following: audio data, video data, location data, and sensor data.

10. The system of claim 7, further comprising the emergency logic further to establish a connection with a contact, and to transmit data to the contact, without providing an audio or visual feedback at the mobile device.

11. A gesture recognition system in a handheld device including an accelerometer, the gesture recognition system comprising:
    a gesture registration logic to register a series of motions as a gesture made with the handheld device, the gesture registration logic to enable the user to register an unobtrusive emergency routine initiation gesture, the emergency routine initiation gesture designed to be easily performed and not easily viewed as an action by a third party observer, the emergency routine initiation gesture verified as not matching a subset of known accidental motion sequences associated with activities that may be concurrent with the initiation gesture;
    the gesture registration logic further to verify that a suggested gesture does not match the subset of known accidental motion sequences associated with activities that may be concurrent with the gesture, and to reject the suggested gesture when the suggested gesture matches any known accidental motion sequence in the subset of known accidental motion sequences, the gesture registration logic enabling the user to override the rejection and add the suggested gesture to the gesture library;
    an intelligent signal interpretation engine (ISLE) to recognize user movements as the emergency routine initiation gesture;
    an emergency logic to initiate an emergency sequence in response to the unobtrusive emergency routine initiation gesture, the emergency sequence designed to call for help on behalf of the user without providing visual or auditory feedback on the handheld device which may be detected by the third party observer.

12. The system of claim 11, further comprising:
    a black box recorder to automatically initiate a full recording of data from the device in a secure store on the device when the emergency logic initiates an emergency.

13. The system of claim 12, wherein the data comprises one or more of the following: audio data, video data, location data, and sensor data.

14. The system of claim 11, further comprising the emergency logic further to establish a connection with a contact, and to transmit data to the contact.

15. The system of claim 14, wherein the data comprises one or more of the following: an emergency notification message, location data, and current data obtained by the handheld device.

16. A method comprising:
    receiving a proposed new gesture for addition to a gesture library from a user;
    determining a command associated with the proposed new gesture;
    determining a plurality of activities that may be concurrent with the command associated with the proposed new gesture;
    rejecting the proposed new gesture when the proposed new gesture is determined to be too close to a subset of known accidental motion patterns associated with the plurality of activities that may be concurrent with the command associated with the proposed new gesture, or when the proposed new gesture is determined to be too close to an existing gesture, and otherwise adding the proposed new gesture to the gesture library;
    informing the user of the rejection and enabling the user to override the rejection and add the suggested gesture to the gesture library;
    receiving accelerometer data;
    identifying a gesture based on the accelerometer data and the gesture library; and
    generating one or more commands based on the identified gesture.

17. The method of claim 16, further comprising:
rejecting the proposed new gesture if it is too close to an existing gesture in the gesture library.

18. The method of claim 16, further comprising:
adjusting the gestures in the gesture library based on an ambient noise level.

19. The method of claim 16, further comprising:
an adjustment logic to identify a cadence of motion of the user, and to adjust the gesture library to account for the cadence of motion.

20. The method of claim 16, further comprising:
enabling registration of an unobtrusive emergency gesture to initiate an emergency process when the unobtrusive emergency gesture is detected.

21. The method of claim 16, further comprising:
turning off a gesture in the gesture library if the gesture conflicts with a current activity level of the user.

* * * * *